United States Patent
Wang

(10) Patent No.: US 8,329,329 B2
(45) Date of Patent: Dec. 11, 2012

(54) BATTERY COVER AND ELECTRONIC DEVICE USING THE SAME

(75) Inventor: Shao-Ying Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 569 days.

(21) Appl. No.: 12/507,932

(22) Filed: Jul. 23, 2009

(65) Prior Publication Data
US 2010/0266884 A1     Oct. 21, 2010

(30) Foreign Application Priority Data
Apr. 17, 2009   (CN) .......................... 2009 1 0301638

(51) Int. Cl.
*H01M 2/04*     (2006.01)

(52) U.S. Cl. ......................................... 429/100; 429/96
(58) Field of Classification Search ............ 429/96–100, 429/1
See application file for complete search history.

(56) References Cited

U.S. PATENT DOCUMENTS
2007/0003825 A1*   1/2007   Touchton et al. ............... 429/97

FOREIGN PATENT DOCUMENTS
EP         1 463 275 A1 *   9/2004

* cited by examiner

Primary Examiner — Maria J Laios
(74) Attorney, Agent, or Firm — Altis Law Group, Inc.

(57) ABSTRACT

A battery cover includes a main body, two guiding members, a resilient member received in the main body, and an end cover arranged at one end of the main body. The guiding members are slidably received in the main body. The resilient member resists the guiding members. The resilient member not only provides an elastic force, but also positions the at least one guiding member in the main body.

4 Claims, 3 Drawing Sheets

BATTERY COVER AND ELECTRONIC DEVICE USING THE SAME

BACKGROUND

1. Technical Field

The present disclosure generally relates to battery storage in electronic devices and, particularly, to a battery cover for a wireless electronic device.

2. Description of Related Art

Wireless devices, such as wireless keyboards and wireless mice, often include an emitter sending a signal and a battery providing power to the emitter. For installation or removal of the battery, a detachable battery cover is often utilized.

A commonly used battery holder set in a wireless keyboard includes a battery bay formed at one side of the keyboard and a battery cover detachably connected with the battery bay. The battery is received in the battery bay and positioned by the battery cover. The inner sidewall of the battery bay defines a guiding slot and a positioning slot arranged near the guiding slot. The sidewall of the battery bay forms a guiding member, the head of which elastically protrudes from the sidewall. The battery cover can fix to the sleeve via the guiding member sliding in the guiding slot. When the guiding member reaches the end of the guiding slot, the head of the guiding member is compressed, so that the guiding member can be engaged in the positioning slot. Thus, the battery cover is fixed to the battery bay, and the battery retained in the battery holder.

However, to avoid the guiding member separating from the battery cover, the guiding member is often adhered thereto by glue. Over time, the guiding slot and the guiding member may be abraded, making it difficult to disassemble the guiding member from the battery cover. If the guiding member is broken, replacement of the entire battery cover is required, increasing repair costs.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
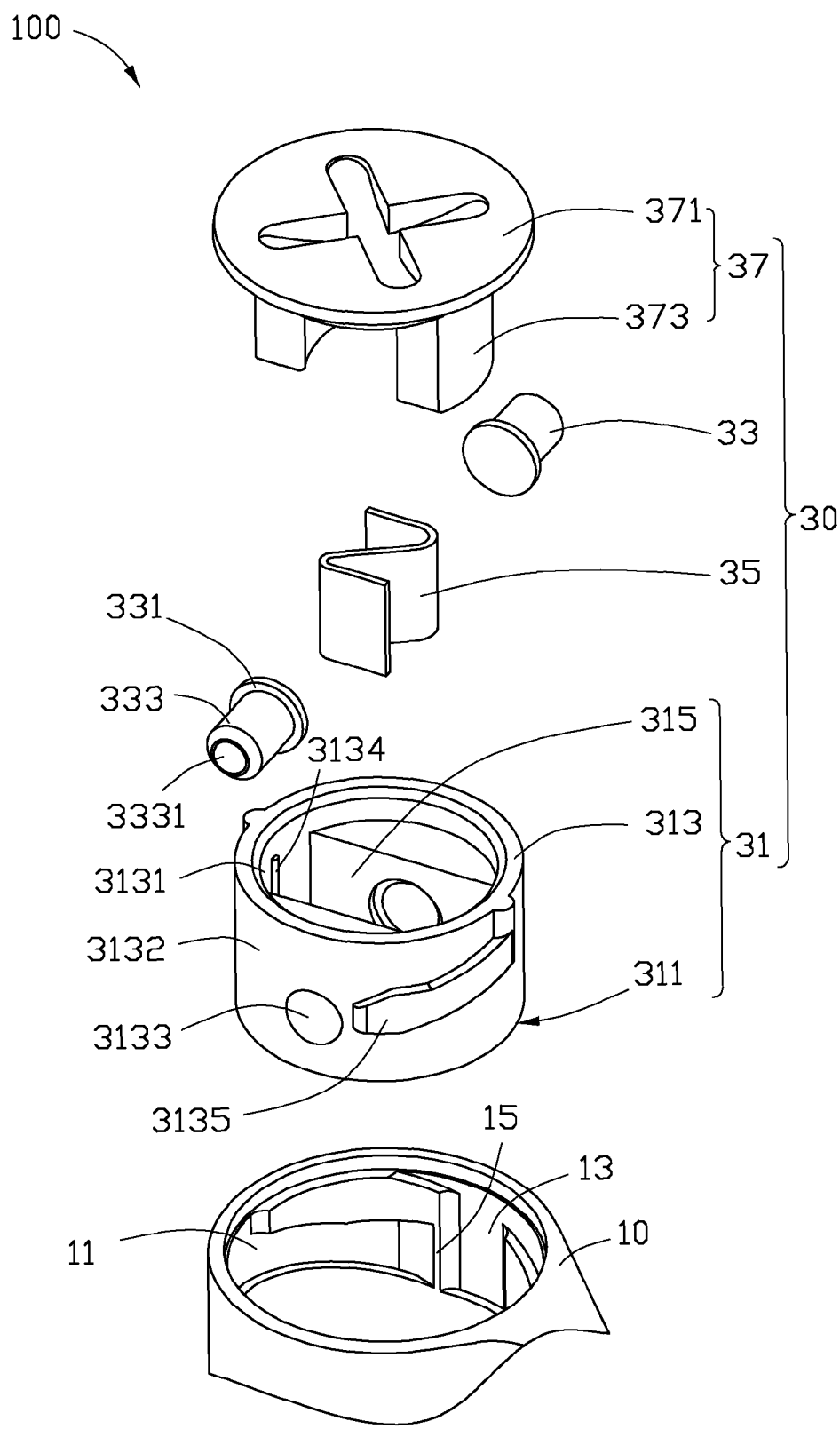
FIG. 1 is an exploded, isometric view of part of an electronic device including a battery cover.

Referring to FIG. 1, electronic device 100 includes a battery receptacle 10 and a battery cover 30 connecting with the battery receptacle 10. For purposes of illustration, the electronic device 100 here described is a wireless keyboard, although any other suitable device is equally applicable while remaining well within the scope of the disclosure.

The battery receptacle 10 defines a guiding slot 11 and a positioning slot 13 arranged near the guiding slot 11. A connecting portion 15 is formed between the guiding slot 11 and the positioning slot 13.

Figure 2:
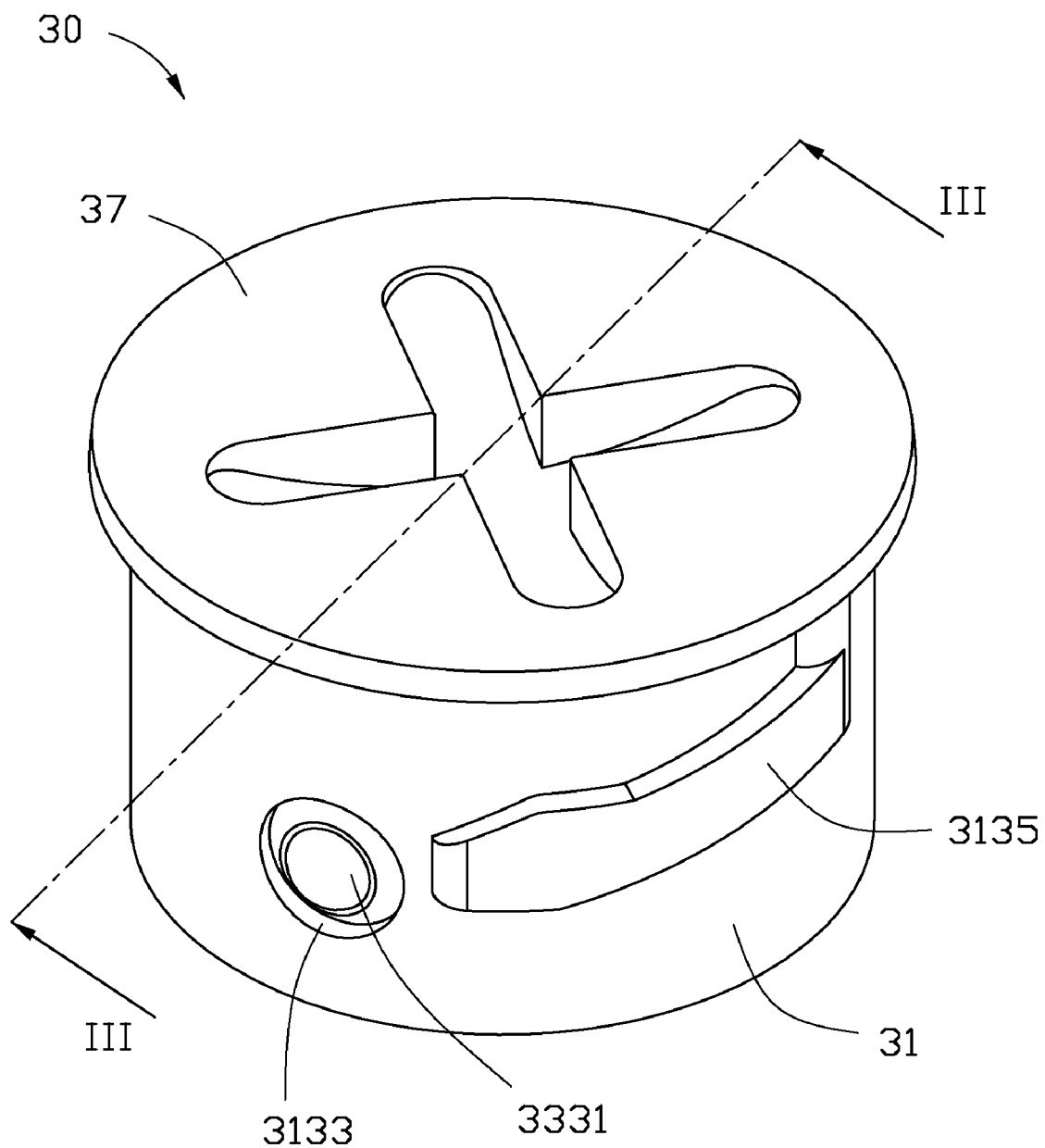
FIG. 2 is an assembled, isometric view of a battery cover utilized in an electronic device, such as, for example, that of FIG. 1.

Referring to FIG. 1 and FIG. 2, the battery cover 30 includes a main body 31, two guiding members 33 and a resilient member 35 received in the main body 31, and an end cover 37 arranged at one end of the main body 31.

The main body 31 is made by powder metallurgic process, and includes a base wall 311 and a sidewall 313 extending substantially perpendicular from the edge of the base wall 311. A receiving space 315 is formed by the base wall 311 and the sidewall 313. The sidewall 313 includes an inner surface 3131 and an outer surface 3132. Two receiving holes 3133 are defined between the inner surface 3131 and the outer surface 3132 and communicate with the receiving space 315. A fixing portion 3134 protrudes from the inner surface 3131, and an engaging portion 3135 protrudes from the outer surface 3132. Here, the receiving holes 3133 are shoulder holes with the diameter of the end of the receiving holes 3133 adjacent to the receiving space 315 exceeding that of the end of the receiving holes 3133 adjacent to the outside of the main body 31. The receiving holes 3133 are arranged opposite to each other.

Each guiding member 33 is received in one receiving hole 3133 of the main body 31. Each guiding member 33 includes a restricting portion 331 and a shaft portion 333. The restricting portion 331 is formed on a proximal end of the shaft portion 333. A protrusion 3331 is formed on a distal end of the shaft portion 333. Each restricting portion 331 is received in the receiving hole 3133 with the restricting portion 331 extending towards the outer surface 3132 from the inner surface 3131. Each restricting portion 331 resists the shoulder surface of one receiving hole 3133, thus preventing the guiding member 33 from sliding outside of the main body 31 via the receiving hole 3131.

The resilient member 35 is elastic and received in the receiving space 315 of the main body 31. Opposite ends of the resilient member 35 resist the two restricting portions 331 of the two guiding member 33 correspondingly.

The end cover 37 includes a head 371 and two restricting walls 373 extending from one end surface thereof. The restricting walls 373 are opposite to each other and received in the receiving space 315 of the main body 31.

Figure 3:
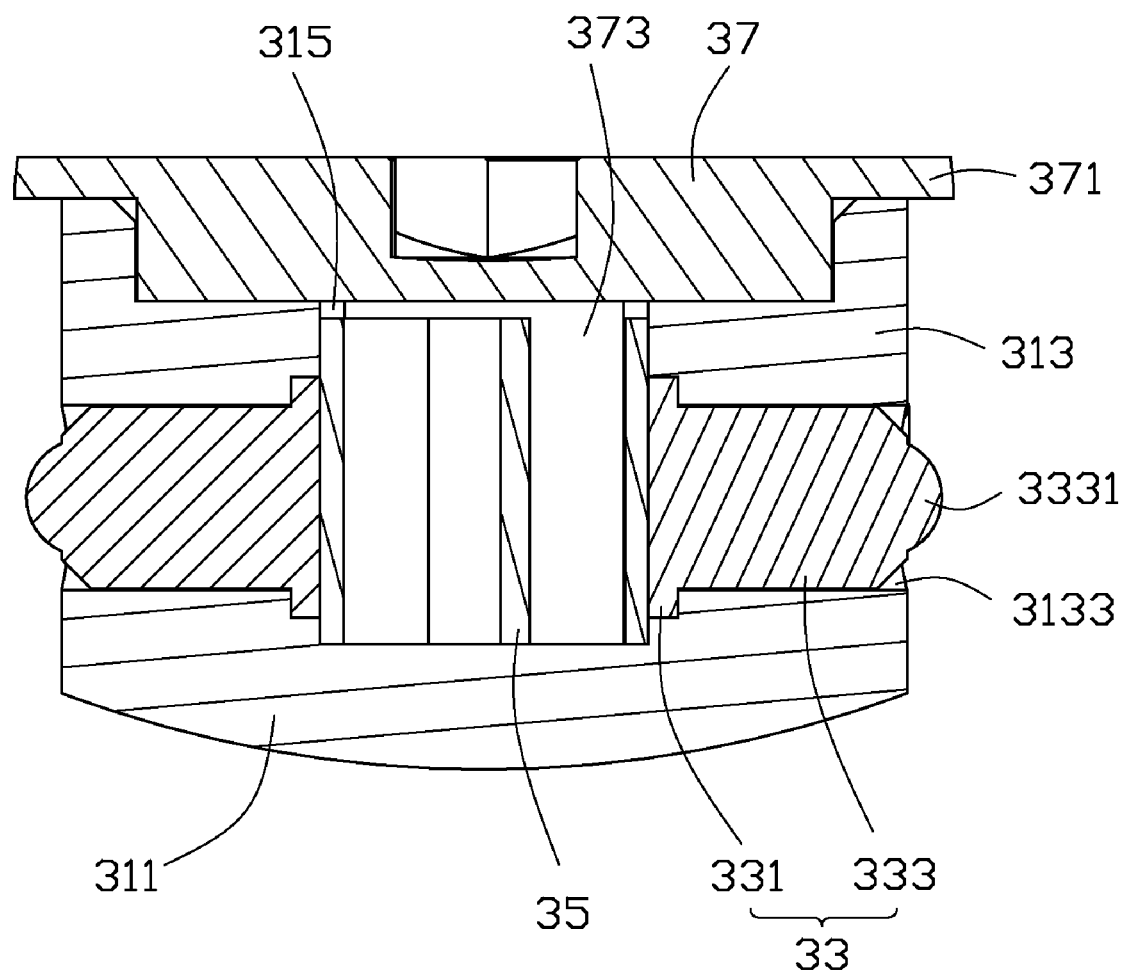
FIG. 3 is a cross-section of the battery cover taken along line III-III of FIG. 2.

Referring to FIG. 1 and FIG. 3, during installation of the battery cover 30, the guiding members 33 are positioned in the corresponding receiving holes 3133 from the receiving space 315 of the main body 31. The resilient member 35 is arranged in the receiving space 315 of the main body 31, with two ends resisting the two guiding members 33 to force the protrusion 3331 of the guiding member 33 towards the outside of the main body 31. The restricting walls 373 of the end cover 37 are received in the receiving space 315 of the main body 31. The end cover 37 is fixed with the main body 31 by an interference fit between the fixing portion 3134 of the sidewall 313 and the restricting walls 373. The resilient member 35 is positioned between the restricting walls 373 and is prevented from shifting in the receiving space 315 thereby.

The battery cover 30 is attached to the battery receptacle 10 by rotating the battery cover 30. The protrusions 3331 of the guiding members 33 contact the guiding slot 11 of the battery receptacle 10, and the engaging portion 3135 of the main body 31 slide along the guiding slot 11. When the protrusion 3331 reaches the joint section of the guiding slot 11 and the connecting portion 15, the sidewall of the guiding slot 11 pushes against the protrusions 3331 thereby compressing and deforming the resilient member 35. Accordingly a part of the protrusions 3331 withdraw into the receiving holes 3133. As the battery cover 30 is rotated, each protrusion 3331 slides out of one guiding slot 11 and into one positioning slot 13 passing the connecting portion 15. The engaging portions 3135 are engaged in the positioning slots 13, and the protrusions 3331 protrude outside of the main body 31 and engage the positioning slot 13 by the elastic force created by the resilient member 35, so that the battery cover 30 is fixed to the battery receptacle 10. Removal of the battery cover 30 from the battery receptacle 10 requires only that the battery cover 30 be counter-rotated such that the guiding members 33 compress the resilient member 35, and slide out of the battery receptacle 10 from the positioning slot 13 via the guiding slot 11.

The resilient member 35 resists the guiding member 33 to position and apply elastic force thereto, so that there is no need to fix the guiding member 33 with the main body 31. Therefore, the guiding member 33 can be slidably arranged in the receiving hole 3313 of the main body 31. If abrasion occurs, only the guiding member 33 would need to be replaced, instead of the entire battery cover 30, thus reducing repair costs.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An electronic device, comprising:
   a battery receptacle receiving a battery, the battery receptacle defining a guiding slot and a positioning slot; and
   a battery cover detachably connecting with the battery receptacle, the battery cover comprising:
   a main body forming an engaging portion slidably engaged in the guiding slot;
   an end cover received in the main body;
   at least one guiding member received in the main body; and
   a resilient member received in the main body, resisting the at least one guiding member;
   wherein the guiding member is slidable between the guiding slot and the positioning slot; the resilient member to generate an elastic force to urge the guiding member into the guiding slot or the positioning slots;
   wherein the main body comprises a base wall and a sidewall extending from the base wall in which the at least one guiding member is received; the base wall and the sidewall form a receiving space in which the resilient member is received; the sidewall of the main body defines at least one receiving hole in which the at least one guiding member is slidably received, such that the at least one guiding member is capable of protruding out of the main body.

2. The electronic device of claim 1, wherein the at least one guiding member comprises a shaft portion and a restricting portion formed on a proximal end of the shaft portion; and the at least one receiving hole is a shoulder hole.

3. The electronic device of claim 2, wherein the at least one receiving hole is two receiving holes arranged opposite to each other; and the at least one guiding member is two guiding members received in the receiving holes correspondingly.

4. The electronic device of claim 3, wherein opposite ends of the resilient member resist the guiding members correspondingly.

* * * * *